United States Patent
Brudny et al.

(10) Patent No.: US 7,836,576 B2
(45) Date of Patent: Nov. 23, 2010

(54) METHOD FOR CONVERTING A COMMUTATOR EXCITER INTO A BRUSHLESS EXCITER

(75) Inventors: Jean-Francois Brudny, Wannehain (FR); Thierry Godin, Montreal (CA)

(73) Assignee: Hydro-Quebec, Montreal, Quebec ( * ) Notice: Subject to any disclaimer, the term of this patent is extended or adjusted under 35 U.S.C. 154(b) by 89 days.

(21) Appl. No.: 11/146,122

(22) Filed: Jun. 7, 2005

(65) Prior Publication Data

US 2005/0223542 A1 Oct. 13, 2005

Related U.S. Application Data (63) Continuation-in-part of application No. 11/007,624, filed on Dec. 9, 2004, now abandoned.

(60) Provisional application No. 60/528,198, filed on Dec. 10, 2003, now abandoned.

(51) Int. Cl.
*H02K 15/00* (2006.01)
(52) U.S. Cl. .................. 29/598; 29/596; 310/68 D; 310/231
(58) Field of Classification Search .......... 310/69 D, 310/68 R, 219, 231; 29/596, 732, 733, 597, 29/598, 602.1, 401.1, 402.1, 402.03, 402.09, 29/426.1, 428
See application file for complete search history.

(56) References Cited

U.S. PATENT DOCUMENTS

| | | | |
|---|---|---|---|
| 5,424,625 A * | 6/1995 | Haner | 318/725 |
| 6,288,471 B1 * | 9/2001 | Kometani et al. | 310/254 |
| 6,483,218 B1 * | 11/2002 | Petrinko | 310/112 |
| 6,628,022 B2 * | 9/2003 | Clayton et al. | 310/68 D |
| 6,956,459 B2 * | 10/2005 | Lau et al. | 337/267 |
| 6,998,726 B2 * | 2/2006 | Sarlioglu et al. | 290/31 |
| 7,119,472 B2 * | 10/2006 | Lacaze | 310/183 |
| 7,185,804 B1 * | 3/2007 | Rozlosnik et al. | 235/379 |

FOREIGN PATENT DOCUMENTS

WO   WO 9745940 A1 * 12/1997

OTHER PUBLICATIONS

Machine Translation of WO97/45940A1, obtained Jan. 3, 2009.*
Method of modifying a direct current generator (translation of WO94/45940), Jan. 2009.*

* cited by examiner

*Primary Examiner*—A. Dexter Tugbang
*Assistant Examiner*—Livius R Cazan
(74) *Attorney, Agent, or Firm*—Buchanan, Ingersoll & Rooney, PC (57) ABSTRACT

A method is disclosed for converting a commutator exciter, also called to as a DC machine, into a brushless exciter while keeping one part of the rotor as well as the stator frame of the DC machine. In an embodiment, the method also keeps the field currents and the time constants of the DC machine so that the exciter's voltage regulator may be kept. Alternatively, the magnetic cores of the DC machine stator poles may also be kept.

11 Claims, 11 Drawing Sheets

METHOD FOR CONVERTING A COMMUTATOR EXCITER INTO A BRUSHLESS EXCITER

CROSS-REFERENCE TO RELATED APPLICATIONS

This application is a continuation in part of U.S. patent application Ser. No. 11/007,624 filed Dec. 9, 2004, now abandoned, and which claims the benefit of U.S. provisional patent application 60/528,198 under 35USC § 119(e), the specification of Ser. Nos. 11/007,624 and 60/528,198 are hereby incorporated by reference.

TECHNICAL FIELD

This invention pertains to the field of rotating exciters. More precisely, this invention relates to the conversion of commutator exciters into brushless exciters.

BACKGROUND OF THE INVENTION

Commutator exciters which are used to provide a DC current signal to rotors of synchronous generators are still widely used today. Most of these commutator exciters have been installed before 1960 and most of them have not been restored yet. In fact, according to Canadian Electronics Association (ACE) statistics of 2002, 10% of the group's downtime is caused by excitation systems.

An increase in the number of failures of the commutator exciters is therefore expected soon due to the growing age of the commutator exciters. In fact, the downtime generates a loss of earning of about 15 k$/year/machine.

Furthermore, it has been contemplated that the failures are also due to brushes, brush holders and field breakers. Maintenance to avoid such failures amounts about 15 k$/year/machine.

There is a need for a method and apparatus that will overcome at least one of the above-identified drawbacks.

SUMMARY OF THE INVENTION

The invention discloses a method for converting a commutator exciter, also referred to as a DC machine, into a brushless exciter, also referred to as a brushless machine, while keeping one part of the rotor as well as the stator frame of the DC machine. In one embodiment, the stator currents, also referred to as field currents, as well as the time constants of the DC machine are also kept so that the voltage regulator of the commutator exciter may also be kept. Alternatively, the magnetic cores of the DC machine stator poles may also be kept, as well as its time constants, by using an external resistance. In such case the voltage regulator is replaced.

According to a first aspect of the invention there is provided a method for converting a DC machine into a brushless machine. The method comprises providing a DC machine having a rotor, the rotor comprising a plurality of brushes, a plurality of coils and a plurality of commutators, removing the plurality of brushes, the plurality of coils and said plurality of commutators and providing a diode assembly on said rotor, said diode assembly having electrical characteristics for replacing the plurality of brushes, the plurality of coils and said plurality of commutators.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1A:
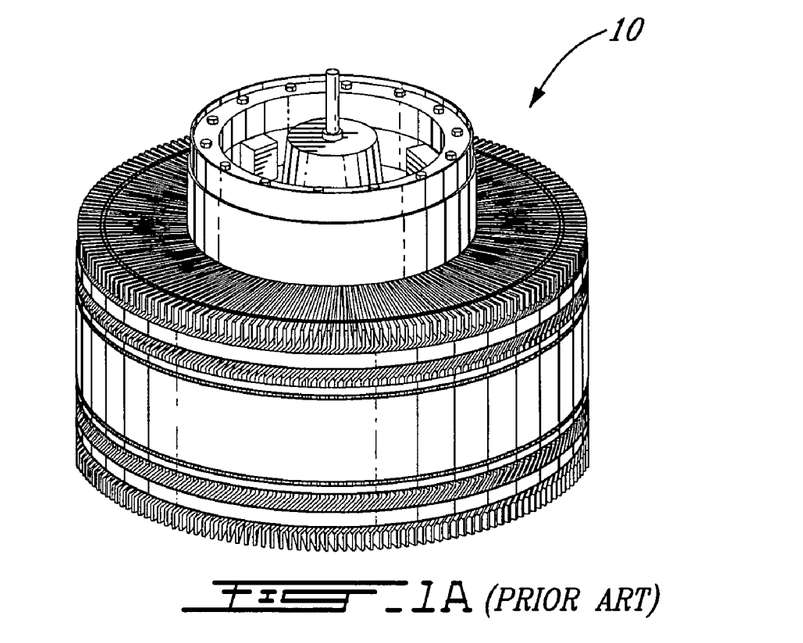
FIG. 1A is a schematic drawing showing a perspective view of a rotor of a prior art DC machine.
Figure 1B:
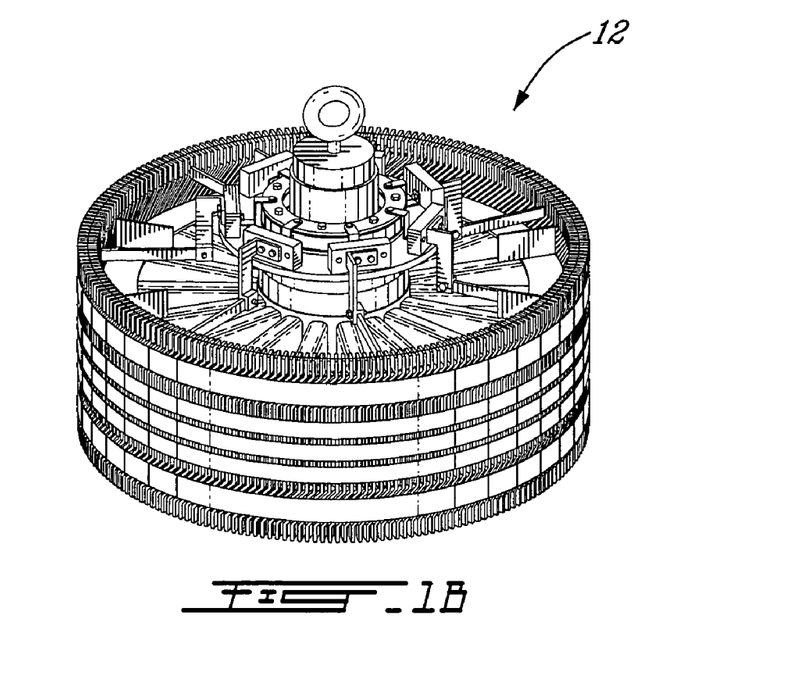
FIG. 1B is a schematic drawing showing a perspective view of the rotor that was converted to be used in a brushless machine according to one embodiment of the invention.

Now referring to FIG. 1a, there is shown a rotor of a prior art DC machine 10. FIG. 1b shows a brushless machine which has been converted according to an embodiment of the invention.

Figure 2A:
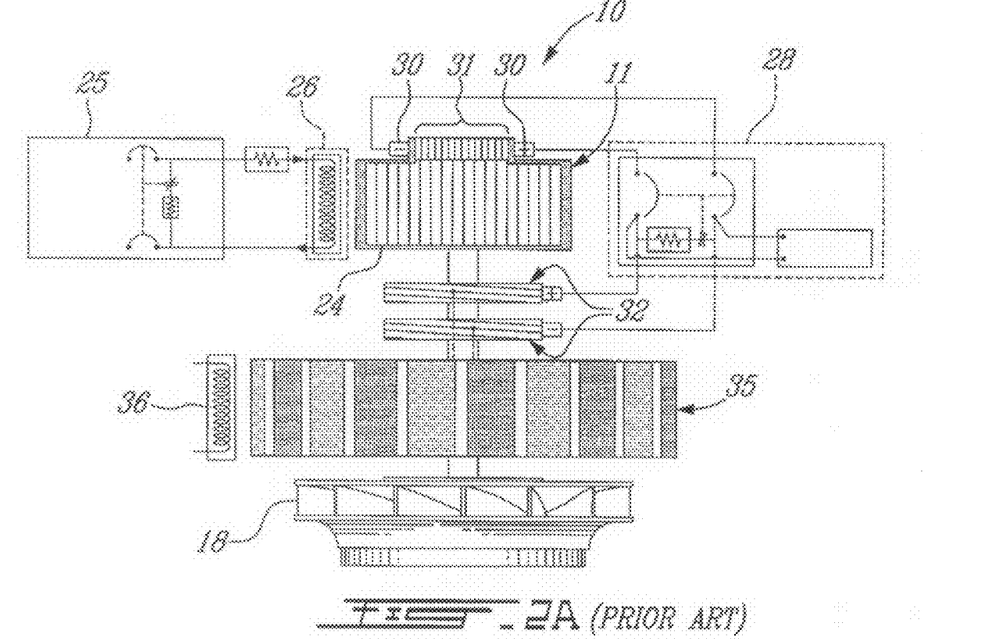
FIG. 2A is a diagram showing, inter alia, a prior art DC machine generating a DC current to be used in a generator assembly.

Now referring to FIG. 2a, there is shown, inter alia, a diagram showing a prior art DC machine generating a DC current signal to be used in a generator assembly.

The DC machine comprises a voltage regulator 25, a plurality of stator poles 26, comprising commutation poles as well as eventually compensation coils, a rotor 11 and a breaker unit 28. In this embodiment, the DC machine is used to provide a DC current signal to the rotor 35 of a generator assembly. The generator assembly comprises a rotor 35 and a stator 36. The rotor 35 shares a shaft with a turbine 18 and the rotor 11. The rotor 11 comprises a plurality of coils 24, a plurality of commutators 31 and carbon brushes 30.

More precisely, the voltage regulator 25 provides a DC excitation current signal, field current, $i_{ex}$ to the plurality of stator poles 26. The field current $i_{ex}$ energizes each of the plurality of stator poles 26. The skilled addressee will appreciate that the plurality of stator poles 26 is equally spaced around the periphery of the rotor 11. Moreover, the skilled addressee will appreciate that the energized plurality of stator poles 26 are wired so that two neighboring stator poles generate opposite magnetic fields.

In one embodiment, the turbine 18 rotates in response to a flow of water. The turbine 18 is operatively connected to the rotor 11 via the rotor 35.

In response to the rotation of the rotor 11 caused by the rotation of the turbine 18 and the field current $i_{ex}$ provided to the stator poles 26, a DC current signal J is generated at the rotor 35. The skilled addressee will appreciate that the DC current signal J is collected using the plurality of brushes 30 and brush-holders. It is known in the art to provide a plurality of + and − lines of brushes wherein each line is being located between two consecutive stator poles. The DC current signal J is provided to the rotor 35 via field breaker 28 and via the generator's collector rings 32 and another set of brushes.

In the embodiment disclosed, the rotor 35 comprises a plurality of field poles and coils which are energized using the DC current signal J. A generated AC current signal is collected at the stator 36 terminals in response to the rotation of the rotor 35 excited by the DC current signal J.

It is known by the skilled addressee that $E_{DC}=k i_{ex\_DC}$, wherein $k=nn_{sp}\pi\gamma\beta NC/av$ in which:

$E_{DC}$ is the electromagnetic force produced by the DC machine;

$i_{exDC}$ is the field current of the DC machine;

E is the DC voltage produced at the terminals of the rotor 35 when drops of voltage across the brushes are neglected;

n is the total number of active conductors of the DC machine rotor winding and is equal to n=nenc.ncond, wherein:

nenc=number of rotor slots of the DC machine, ncond=number of conductors per rotor slot of the DC machine;

$n_{sp}$ is the number of insulated copper turns of each field coil of the DC exciter stator poles;

γ is the ratio of net area of the air gap under a pole over complete surface of the polar piece;

β is the peripherical length of the stator pole shoe divided by the distance between two stator poles axis measured at the level of the air gap between the stator and the rotor of the exciter;

N is the rotation speed of the rotor 35 (RPM/s);

C is a construction coefficient and is equal to $C=(D/2-e)L\mu_0/e_c$ Henry;

$e_c = k_c \cdot e$ is the value of the air-gap thickness e corrected by the $k_c$ Carter coefficient;

D is the bore diameter of the exciter;

L is the length of the rotor magnetic iron;

$\mu_0$ is the permeability of the vacuum [H/m];

2a is the number of winding paths of the DC machine winding; and

ν is the Hopkinson coefficient (ratio of the total magnetic flux created at the DC machine stator pole based on the net flux which crosses the air gap).

In the case where voltage drops are neglected across the brushes, $E_{DC}=R \cdot J$, so the field current $i_{exDc}$ required to provide J is equal to $i_{exDC}=RJav/nn_{sp}\pi\gamma\beta NC$, where J is the DC current flowing through the polar wheel (rotor field coils) of the generator; and R is the resistance of the polar wheel.

Figure 2B:
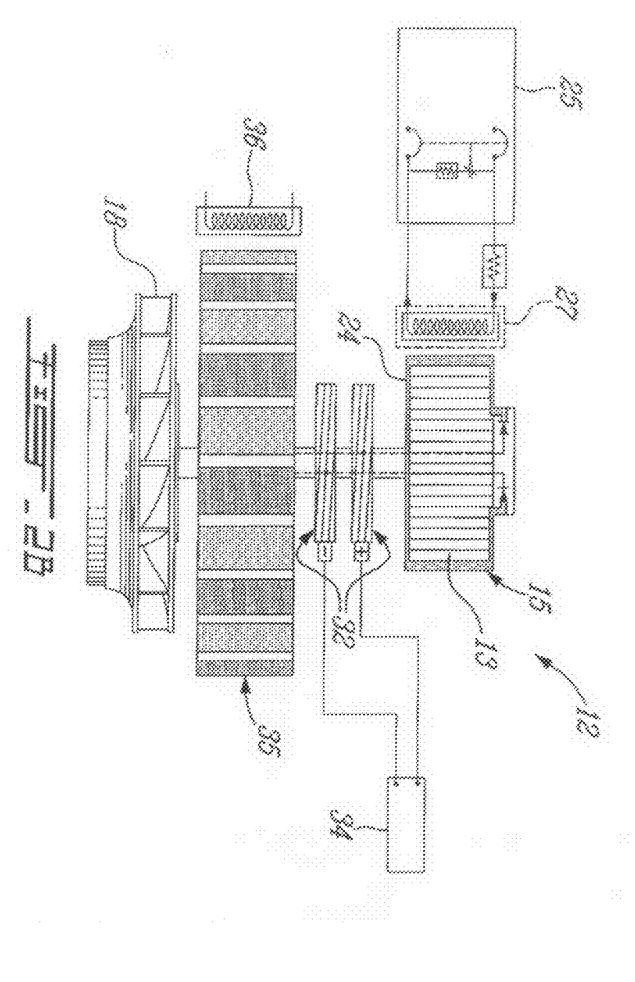
FIG. 2B is a diagram showing, inter alia, a brushless machine generating a DC current to be used in a generator assembly.

Referring to FIG. 2b, there is shown, inter alia, a brushless machine 12 generating a DC current signal J to be used in a generator assembly according to the one embodiment of the invention.

The brushless machine comprises a voltage regulator 25, a plurality of stator poles 27, a rotor 15 and an optional field ground protection unit 34. The generator assembly comprises a rotor 35 and a stator 36. The rotor 35 shares a shaft with a turbine 18 and the rotor 15. The rotor 15 comprises a plurality of coils 24 and a diode wheel (Not shown here. See FIGS. 5, 6 and 7 for details).

More precisely, the voltage regulator 25 provides a field current signal $i_{ex}$ to the stator poles 27. The field current $i_{ex}$ energizes each of the plurality of stator poles 27. The skilled addressee will appreciate that the plurality of stator poles 27 is equally spaced around the periphery of the rotor 15. Moreover, the skilled addressee will appreciate that the energized stator poles 27 are wired so that two neighboring stator poles generate opposite magnetic fields.

In one embodiment, the turbine 18 rotates in response to a flow of water. The turbine 18 is operatively connected to the rotor 15 via the rotor 35.

In response to the rotation of rotor 15 caused by the rotation of the turbine 18 and the field current $i_{ex}$ provided to the stator poles 27, a rectified DC signal J is generated and is provided to the rotor 35. Alternatively, an optional field ground protection unit 34 may be used. The optional field ground protection unit 34 provides a signal to the rotor 35 using the collector rings 32. It will be appreciated that in such embodiment, the breaker unit 28 is not re-used as a consequence of the conversion.

Furthermore, it will be appreciated that in this embodiment, the rotor 15 does not comprise brushes. The rotor 15 comprises a diode assembly, comprising a diode wheel and rotor coils 24 which are responsible for providing the DC signal J (See FIGS. 5, 6 and 7 for details). The rotor coils 24 are located in a plurality of rotor slots 13 located on the outside surface of the rotor 15, as shown also in FIG. 9.

Figure 3:
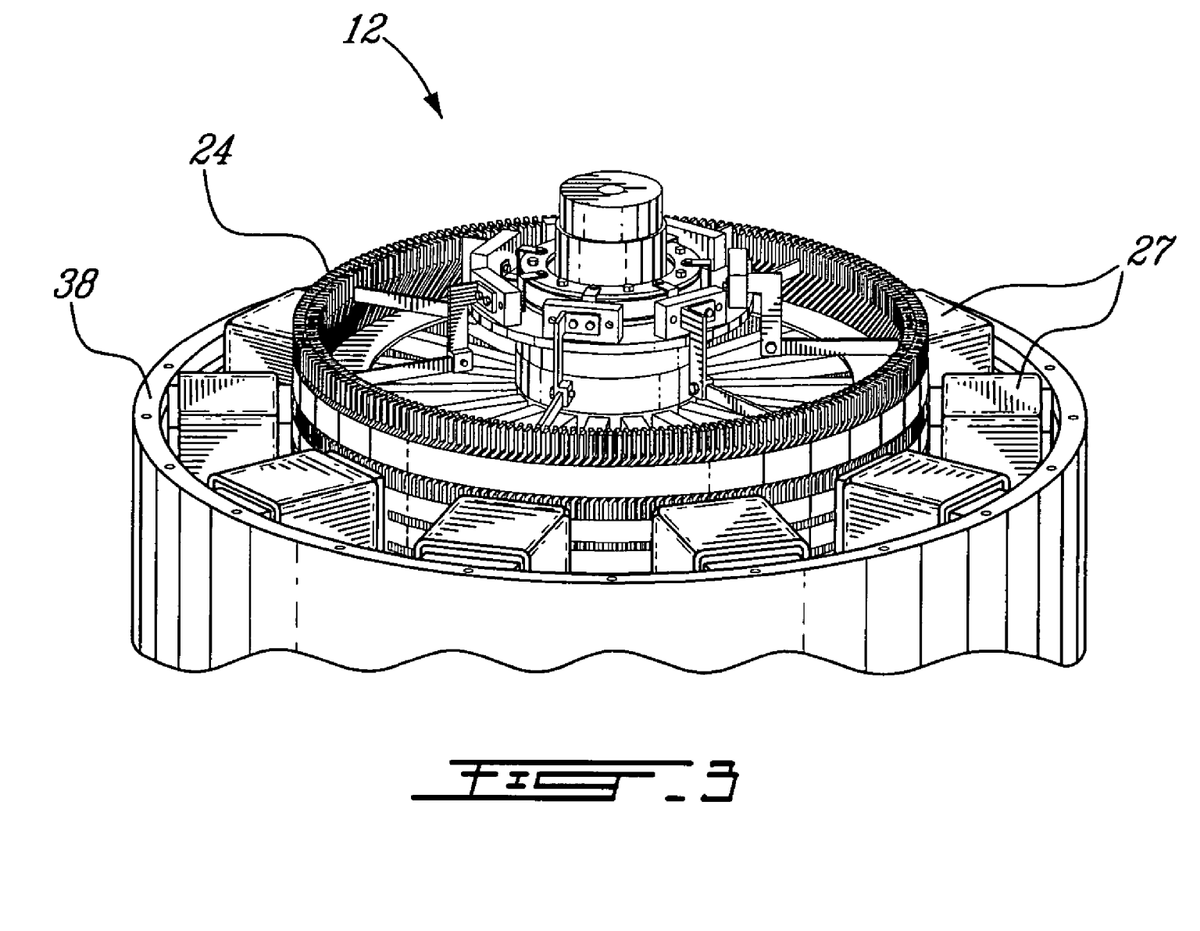
FIG. 3 is a drawing showing a perspective view of a rotor, that was converted according to one aspect of the invention, and a stator of a brushless machine, wherein the stator comprises field poles bolted to a stator frame.

Now referring to FIG. 3, there is shown an embodiment of the brushless machine 12 and a corresponding stator frame 38 equipped with the stator poles 27.

The plurality of stator poles 27 are secured to the stator frame 38. As explained previously, the plurality of stator poles 27 is equally distributed on the stator frame 38.

As also explained above, the rotor 15 comprises the plurality of rotor slots 13 (not shown here) and rotor coils 24.

Figure 4:
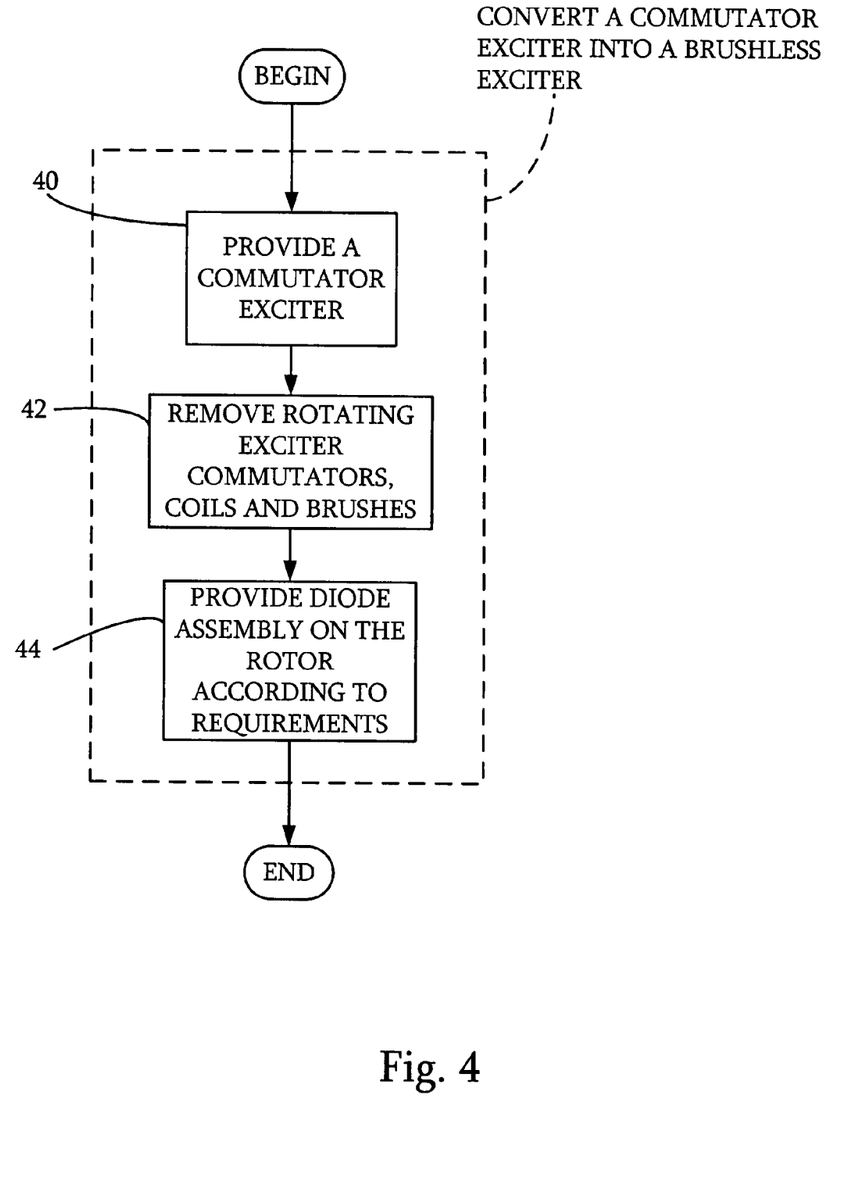
FIG. 4 is a flowchart showing how a DC machine is converted into a brushless machine; according to a first step, the rotor of a DC machine is provided, according to a second step a plurality of elements of the rotor are removed and according to a third step a diode assembly is provided on the rotor according to given requirements.

Now referring to FIG. 4, there is shown how a DC machine is converted into a brushless machine.

According to step 40, the rotor of the DC machine is provided. In a first embodiment, the rotor is removed from the assembly where it is secured together with its corresponding stator frame 38.

According to step 42, at least one part of the rotor is removed from the rotor. More precisely, the plurality of coils 24 and the plurality of commutators 31 are removed from the rotor.

In a preferred embodiment, the plurality of stator poles 26 of the DC machine, including commutations poles and compensation coils, are also removed from the stator frame and are replaced by another plurality of stator poles 27. It will be appreciated by the skilled addressee that in the case where the plurality of stator poles 26 are removed from the DC machine and are replaced by new ones, it may be possible to keep the existing voltage regulator while in the case where the plurality of stator poles 26 are kept, it is necessary to change the voltage regulator.

According to step 44, a diode assembly is provided on the rotor 15 according to various given electrical and mechanical requirements. It should be appreciated that the various given electrical and mechanical requirements may have to be fulfilled depending on what is performed in step 42.

At this point it should be appreciated that the DC machine 10 is converted into a brushless machine 12. The skilled addressee will appreciate that in order to use the converted brushless machine 12, the rotor 15 and its components are mounted back into the frame of the stator.

In the embodiment where the voltage regulator is kept, the stator is further changed as explained above.

Various embodiment of a diode assembly may be used according to the given requirements. It has been contemplated that preferably the diode assembly comprises diodes whose peak inverse voltage is greater than the maximum voltage induced in the rotor 35 in case of troubles.

Figure 5:
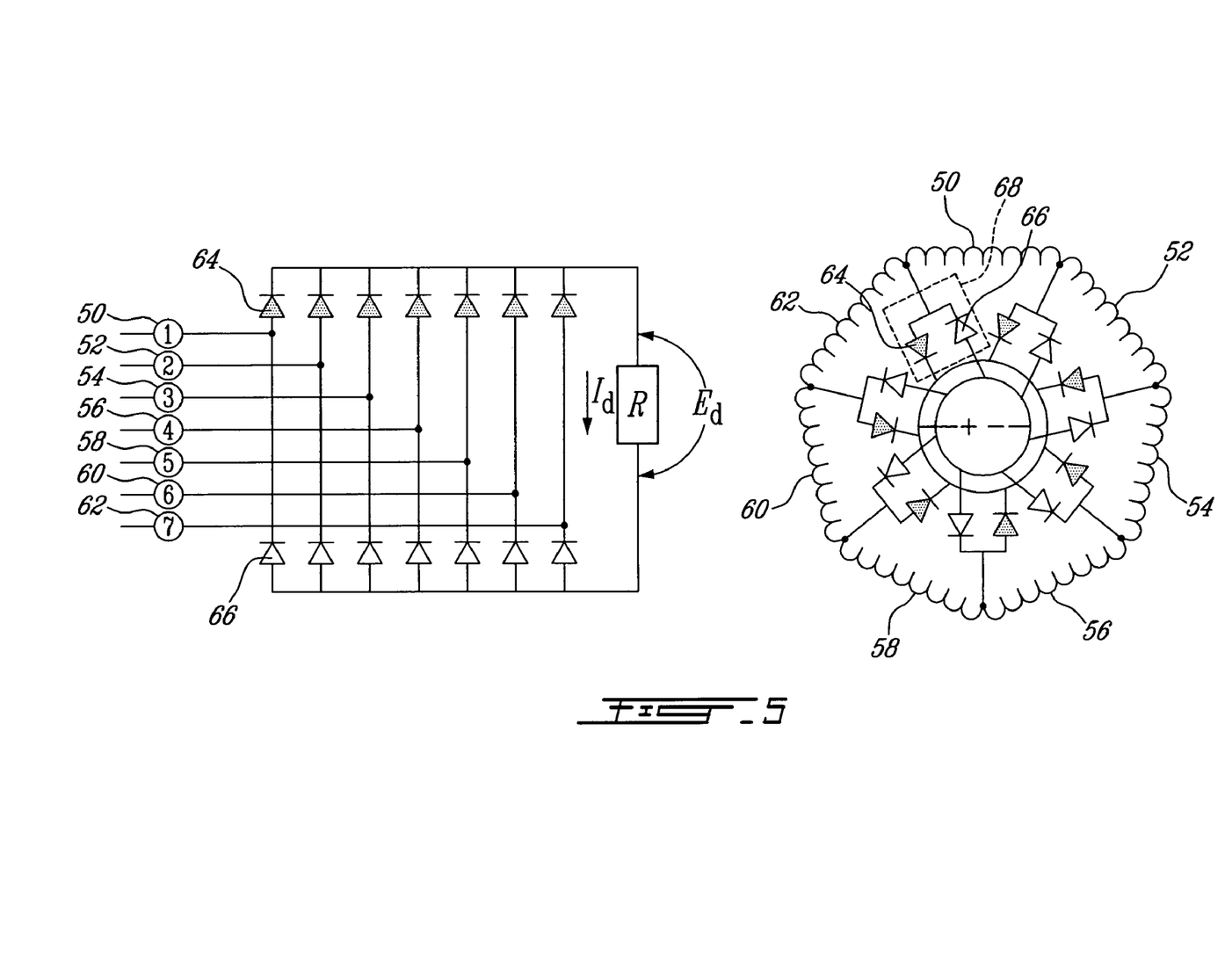
FIG. 5 is an electrical schematic as well as a corresponding symbolic electrical schematic showing an embodiment of a diode assembly comprising a diode wheel circuit to be used with a rotor that is converted to create a brushless machine; the diode assembly is an heptaphase diode assembly which comprises seven sets of coils wounded around the rotor and which form the rotor winding.

Referring to FIG. 5, there is shown a first embodiment of a diode assembly to be used on the rotor of the brushless machine. In this first embodiment, the diode assembly is a heptaphase diode assembly. The skilled addressee will appreciate that in this case care must be kept for the homopolar currents.

More precisely, the diode assembly comprises seven set of coils, respectively 50, 52, 54, 56, 58, 60 and 62. The first set of coils 50 is electrically connected to the second set of coils 52 which is electrically connected to the third set of coils 54. The third set of coils 54 is electrically connected to the fourth set of coils 56 which is electrically connected to the fifth set of coils 58. The fifth set of coils 58 is electrically connected to the sixth set of coils 60 which is electrically connected to the seventh set of coils 62. Finally the seventh set of coils 62 is electrically connected to the first set of coils 50. The skilled addressee will appreciate that a set of rotor coils may also be referred to as a rotor winding.

Each connection between two successively connected sets of coils is electrically connected to both a positive line via a first diode and further a negative line via another diode.

For instance, the connection between the first set of coils 50 and the seventh set of coils 62 is electrically connected to the positive line, copper ring, via diode 64 while the connection between the first coil 50 and the seventh coil 62 is also electrically connected to the negative line, using another copper ring insulated from the preceding, via diode 66. Diode 64 and diode 66 form a diode group 68.

Figure 8:
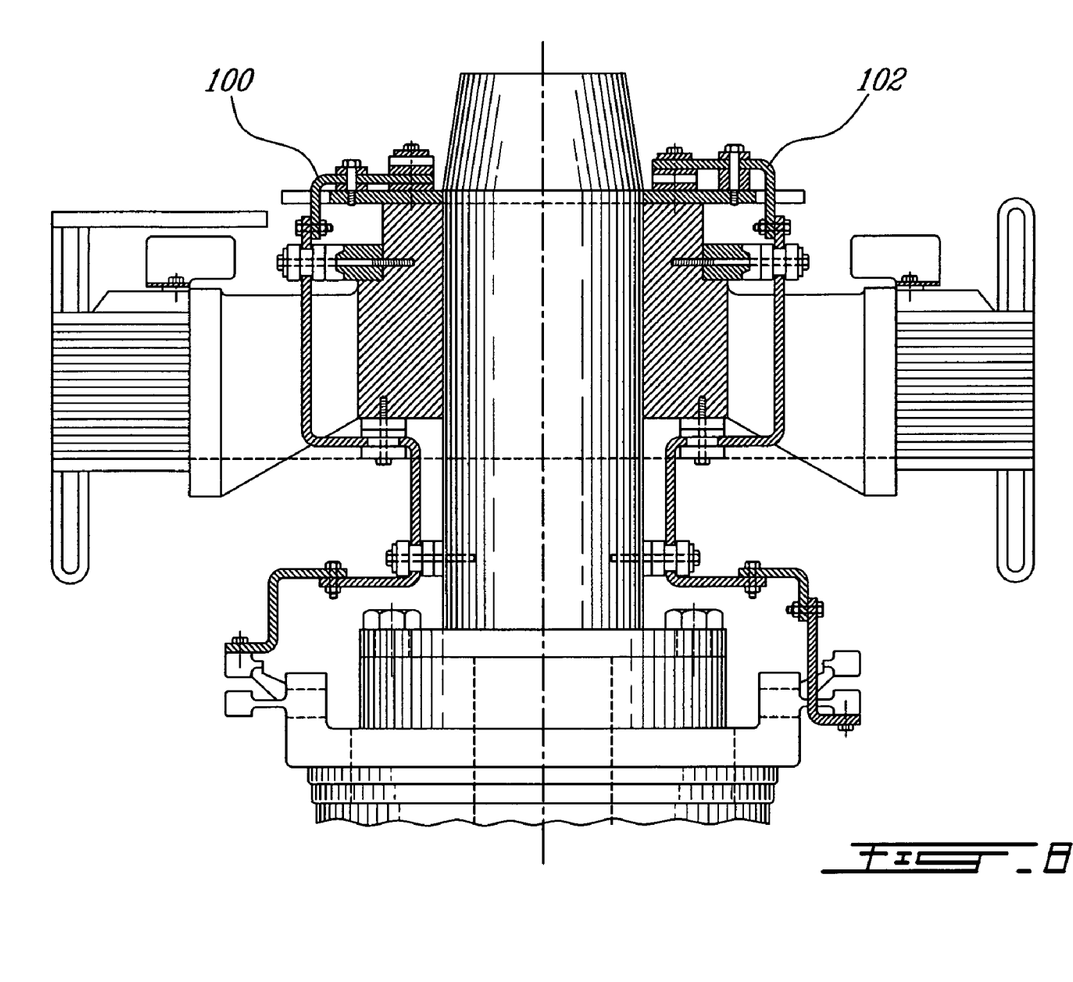
FIG. 8 is a cross-section view showing, inter alia, a rotor of a brushless machine bolted to the shaft of the rotor 35.

The DC signal J is collected using copper connexions 100 and 102 which join the positive and the negative diodes copper rings to the collector rings 32 and which are shown in FIG. 8.

Figure 6:
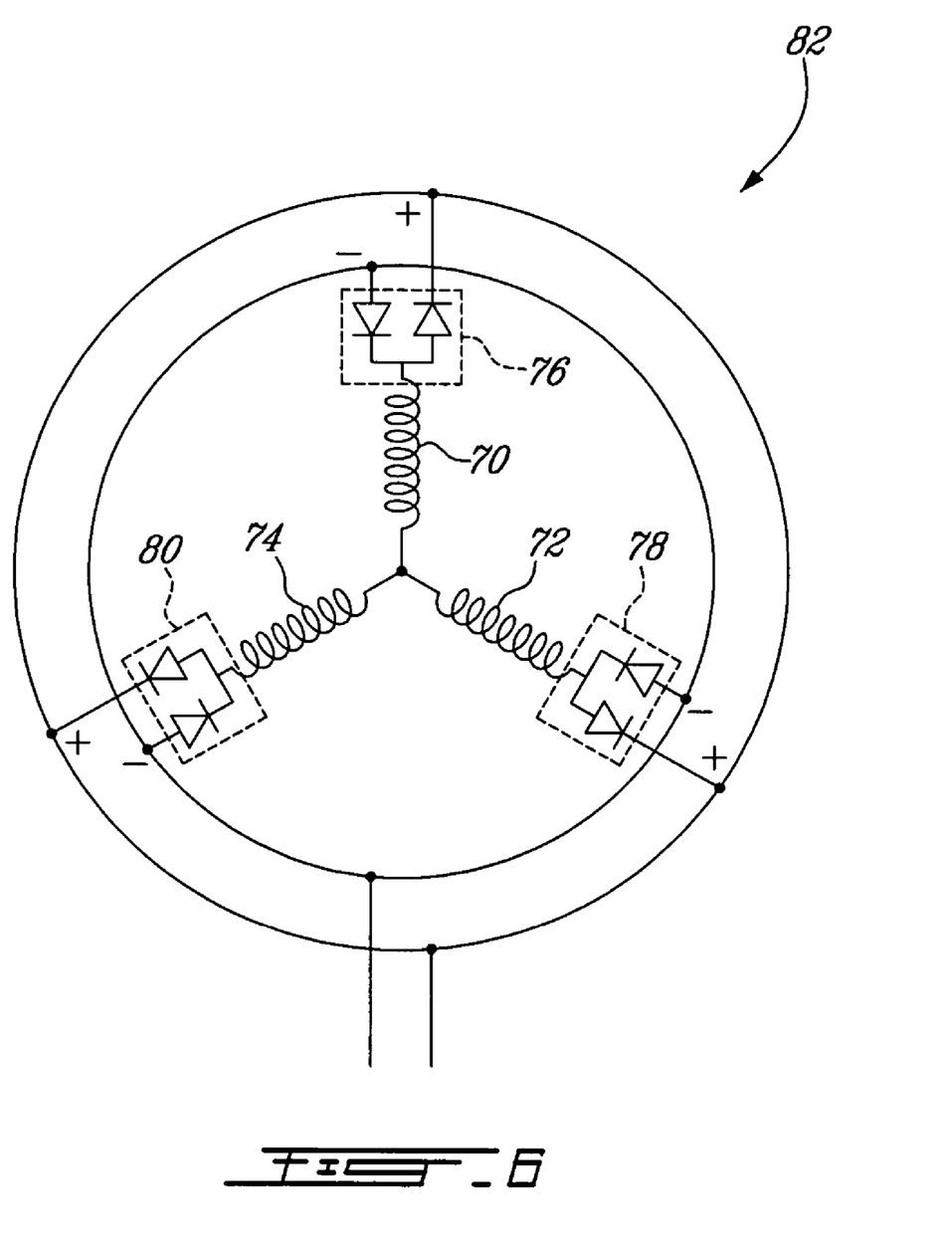
FIG. 6 is an electrical schematic showing another embodiment of a diode assembly to be used with a rotor that is converted to create a brushless machine; in this embodiment, the diode assembly is a 3-phase diode assembly which comprises three set of coils which form the rotor winding.

Now referring to FIG. 6, there is shown a star configuration of a 3-phase diode assembly 82 to be used with the brushless machine in another embodiment of the invention.

The 3-phase diode assembly 82 comprises a first coil 70, a second coil 72 and a third coil 74. In this embodiment, the first coil 70, the second coil 72 and the third coil 74 are all electrically connected using a single connection point. The first coil 70, the second coil 72 and the third coil 74 therefore have a star-wound, also referred to as wye, configuration.

Each other corresponding end of the first coil 70, the second coil 72 and the third coil 74 is connected to a positive line and a negative line via a corresponding first diode group 76, a corresponding second diode group 78 and a corresponding third diode group 80. Each of the corresponding first diode group 76, the corresponding second diode group 78 and the corresponding third diode group 80 comprises two diodes, one of which is connected to the positive line and the other of which is connected to the negative line.

Figure 7:
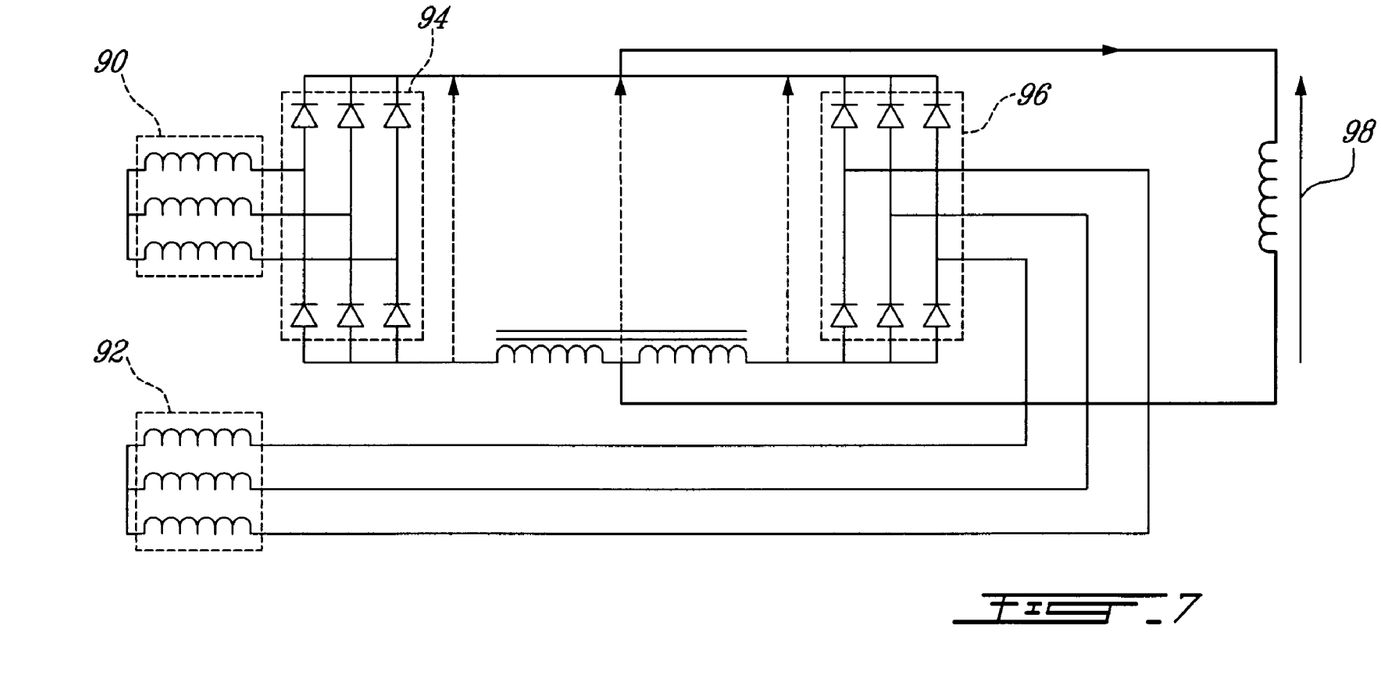
FIG. 7 is an electrical schematic showing another embodiment of a diode assembly to be used with a rotor that is converted to create a brushless machine; in this alternative embodiment, the diode assembly is a double 3-phase diode assembly with an interphase coil.

Now referring to FIG. 7, there is shown a double 3-phase diode assembly whose advantage is the possibility of doubling the wave numbers at the exit of the rectifier bridge by shifting the two stars of 30 electrical degrees which allows a reduction of current fluctuations in the rotor 35.

More precisely, the circuit comprises a first star-wound configuration circuit having three windings 90 and a second star-wound configuration circuit having also three windings 92.

The first star-wound configuration circuit having three windings 90 is electrically connected to a first diode group 94 while the second star-wound configuration circuit having three windings 92 is electrically connected to a second diode group 96.

The first diode group 94 and the second diode group 96 are electrically connected together and a rectified DC signal J is collected at the terminals of the polar wheel 98 of the generator.

Now referring to FIG. 8, there is, shown a cross-section view showing, inter alia, a rotor of a brush less machine and the copper connections 100 and 102 which join the positive = and the negative − diodes copper rings to the generator collector rings which are directly connected to the positive and negative main generator poles.

Figure 9:
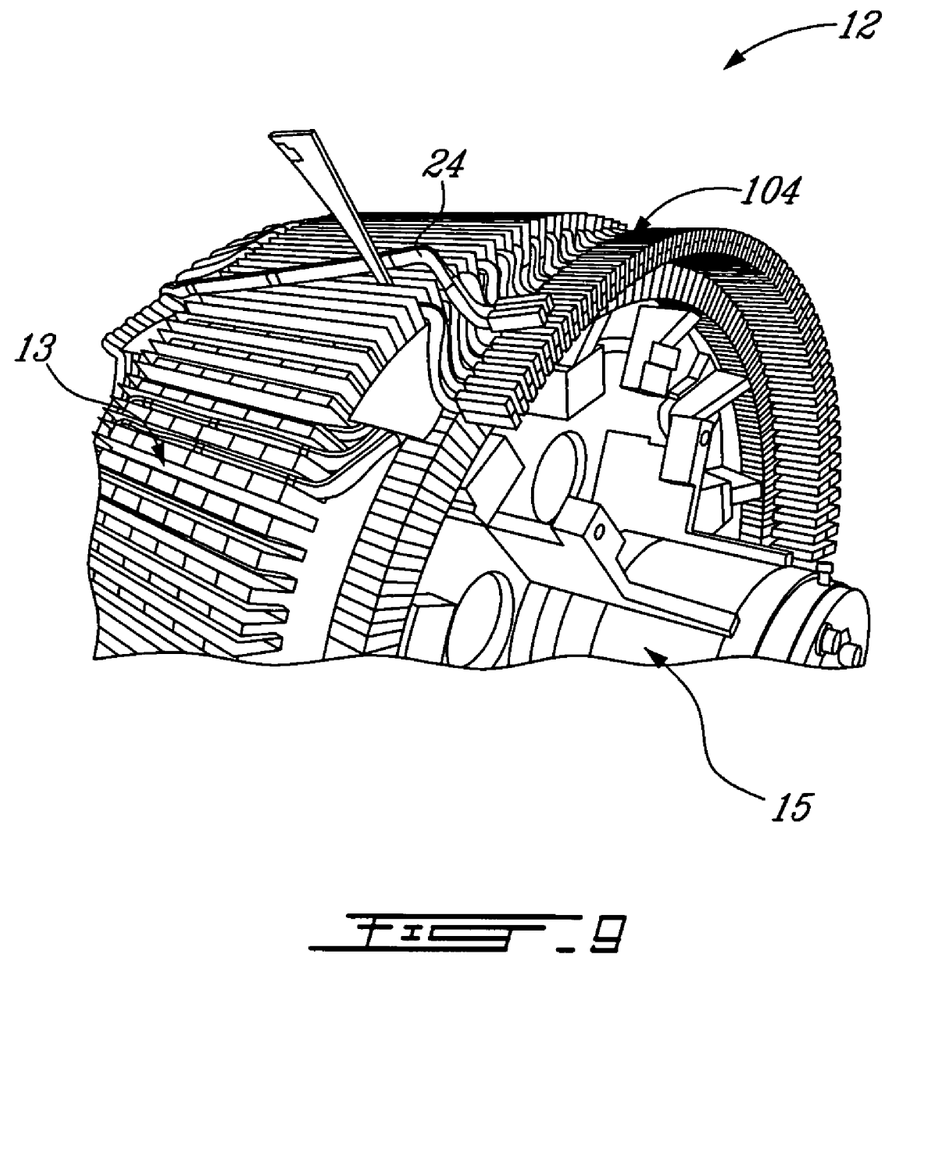
FIG. 9 is a drawing showing a perspective view of a rotor 15 that is converted to create a brushless machine; the rotor comprises a plurality of slots in which one coil of a suitable rotor winding is inserted.

Now referring to FIG. 9, there is shown a perspective view of a brushless machine 12 comprising rotor 15.

The rotor 15 comprises a plurality of rotor slots 13, and a plurality of coils 24 which are wound in the rotor slots 13. The skilled addressee will appreciate that depending on the type of diode assembly used, the plurality of conductors or coils may be located differently in the rotor slots 13.

It can be shown for a star-configuration (E) diode assembly that:

$$i_{exB(E)} = \frac{Jv_B}{4\sqrt{2}\,NCn_{spB}\sin(\beta_B\pi/2)}\left[\left(\frac{\pi R}{2\sqrt{2}\,n_B\sin\pi/q}\right)^2 + \left(\frac{2\sqrt{2}\,NC}{p_B\pi}(1+\sigma)n_B\sin\pi/q\right)^2\right]^{1/2}$$

-continued $$\frac{i_{exB(E)}}{i_{exDC}} = \frac{n}{2a}\frac{n_{sp}}{n_{spB}}\frac{\gamma\beta_B}{2\sin(\beta_B\pi/2)}\left[\left(\frac{\pi^2}{4n_B\sin\pi/n}\right)^2 + \left(\frac{n_B}{p_B R}NC(1+\sigma)2\sin\pi/q\right)^2\right]^{1/2}$$

where:

$i_{exB(E)}$ is equal to the field current of the brushless machine when its rotor winding is connected in star;

$i_{ex}$ is equal to the field current of the old DC machine;

J is the DC current flowing through the polar wheel of the generator;

$\nu_B$ is the Hopkinson coefficient of the brushless machine. It should be appreciated that it is assumed that $\nu_B \sim \nu$);

R is the resistance of the polar wheel of the generator;

C is the construction coefficient. It is assumed that the value of the air gap is unchanged;

$n_{sp_B}$ is the number of insulated copper turns of each field coil of the brushless stator poles;

q is the number of phases of the brushless rotor winding;

$2p_B$ is the number of stator poles of the brushless machine;

$n_B$ is the total number of active conductors of the brushless rotor and is equal to:

$n_B$=nenc.ncond$_B$/$n_{pp}$, wherein:

nenc=number of rotor slots of the exciter (unchanged);

ncond$_B$=number of conductors per rotor slot of the brushless machine;

$n_{pp}$=number of parallel paths per phase of the rotor winding or number of rotor windings connected in parallel;

σ is a coefficient taking into account the magnetic leakage fluxes of the rotor winding (σ~1/12);

$\beta_B$ is a coefficient which defines the stator pole shoe of a brushless machine stator pole; and n, $n_{sp}$, γ, N, 2a, ν have been already defined.

It can be shown for a polygon-configuration (P) diode assembly that:

$$i_{exB(P)} = \frac{J\nu_B}{4\sqrt{2}\,NCn_{spB}\sin(\beta_B\pi/2)}\left[\left(\frac{\pi R}{n_B\sqrt{2}}\right)^2 + \left(\frac{n_B\sqrt{2}}{p_B\pi}NC(1+\sigma)\right)^2\right]^{1/2};$$

$$\frac{i_{exB(P)}}{i_{exDC}} = \frac{n}{2a}\frac{n_{sp}}{n_{spB}}\frac{\gamma\beta_B}{2\sin(\beta_B\pi/2)}\left[\left(\frac{\pi^2}{2n_B}\right)^2 + \left(\frac{n_B}{p_B R}NC(1+\sigma)\right)^2\right]^{1/2}.$$

The skilled addressee will appreciate that $i_{exB(E)}$ reaches a minimum when the number of active conductors is equal to:

$$n_{B(E)opt} = \frac{\pi}{2\sin\pi/q}\left[\frac{p_B R}{2NC(1+\sigma)}\right]^{1/2}$$

Similarly, $i_{exB(P)}$ reaches a minimum when:

$$n_{B(P)opt} = \pi\left[\frac{p_B R}{2NC(1+\sigma)}\right]^{1/2}$$

The above equations lead to the value of the optimized field current for the brushless machine:

$$i_{exBopt} = \frac{J\nu_B}{4n_{spB}\sin(\beta_B\pi/2)}\left[\frac{R(1+\sigma)}{p_B NC}\right]^{1/2}$$

$$\frac{i_{exBopt}}{i_{exDC}} = \frac{n\pi}{4a}\frac{n_{sp}}{n_{spB}}\frac{\gamma\beta_B}{\sin(\beta_B\pi/2)}\left[\frac{(1+\sigma)}{p_B R}NC\right]^{1/2}$$

It will be appreciated that the two preceding equations are independent of the kind of coupling of the rotor winding (E or P) and of the phases number (q).

The skilled addressee should now be able to convert a DC machine into a brushless machine while keeping the main parts of the DC machine, i.e., its stator frame and its iron body as well as its field currents and time constants.

Firstly, $$\left(\frac{i_{exBopt}}{i_{exDC}}\right)_o$$

is calculated beginning with $p_B$=p (NB: subscript o for the field current necessary to create the DC no-load field current $J_o$ at the terminals of the main rotor 35).

In the case where the result is too different from one (1), the number of stator poles $2p_B$ is increased.

The DC signal J is collected using copper connections 100 and 102 which join the positive and the negative diodes copper rings to the collector rings 32 and which are shown in FIG. 8.

A star configuration or a polygon configuration is then chosen as well as a number of phases q (q=3 and a star configuration, whose main advantage is to avoid the risk of homopolar currents, may be used to begin with).

The optimal value of respectively $n_{B(E)opt}$ or $n_{B(P)opt}$ is then determined and the result is compared with different values of $n_B$ ($n_{pp}$=2 and two 3-phased stars in parallel may be used to begin with).

When $n_B$ is determined, all the main parameters of the brushless machine are known and the skilled addressee may continue the calculations with the use of classical formula of electrical machines.

It should be noted that if $2p_B$ is too different from 2p, an intermediate crown of magnetic iron should be inserted between the new field poles and the old stator frame in order to reduce the pole height and thus the Hopkinson coefficient which characterizes the flux leakages.

Also, when considering the general equation of the open-circuit time constant related to the field current rise when a step voltage is applied to the stator windings $\tau^i$, it may be noticed that, in order to keep the same time constants for both the DC and the brushless machines, the brushless field pole resistance $R_{iB}$ should be adjusted so as to get $R_{iB} \sim R_i$, with $R_i$ being the DC machine field pole resistance:

$$\tau_B^i = \frac{L_B^i}{R_B^i} \approx \frac{n_{spB}^2 DL\frac{8}{\pi}\frac{\mu_0}{e_c}\left(\sin\beta_B\frac{\pi}{2}\right)^2}{R_B^i}.$$

It will be appreciated that the above equations may also be used if the voltage regulator should be replaced and if, for economical considerations, it is desired to keep the cores of the DC machine stator poles.

Accordingly, according to a first step, $$\left(\frac{i_{exBopt}}{i_{exDC}}\right)_o$$

is calculated with $p_B = p$.

$n_{spB}$ is increased so as to get a reasonable value for $i_{exB}$.

A star or a polygon configuration is then chosen as well as a number of phases q.

$n_{B(E)opt}$ or $n_{B(P)opt}$ is calculated then and the result is compared with different values of $n_B$.

Taking into account the losses thus the heating of the brushless stator, the optimal section for the copper turns of the field poles is determined.

When $R_{iB}$ is determined, the resistance $R_{eB}$ external to the field poles which should be inserted so as to get nearly the same time constants for both DC and brushless machines is calculated.

It should be appreciated by the skilled addressee that the response ratio $R_{RB}$ of the brushless machine 12 which should be kept as close as possible to the same value $R_{RDC}$ of the DC machine. In order to compare more easily the solutions, it is possible to use the following definition for $R_R$:

$$R_R = 8[0.5 - \tau^{DC}[1 - \exp(-0.5/\tau^{DC})]][U_{ceiling}/U_{exn} - 1]$$

where $\tau^{DC}$ = open-circuit time constant related to the R.J voltage rise when a step voltage is applied to the field poles ($\tau^{DC}$ depends on $\tau^i$);

$U_{exn} = (R_{iB} + R_{eB}) \cdot i_{exn}$, where $i_{exn}$ is the rated load value of the field current;

$U_{ceiling}$ = maximal voltage that the regulator can provide at the terminals of the field poles of the exciter.

Figure 10A:
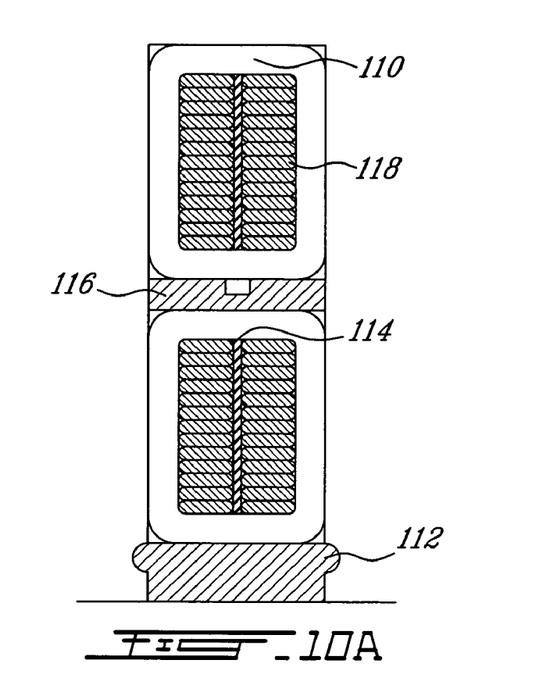
FIG. 10a is a cross section view showing a first embodiment wherein a rotor slot is filled by two single turn bars.

Referring to FIG. 10a, there is shown a first embodiment wherein a rotor slot 13 is filled by two single turn bars. More precisely, the rotor slot 13 is provided with a ground insulation 110, with elementary enameled conductor 118. A separator 116 is further used. A separator 114 is also used to separate two elementary enameled conductor 118. Finally, a slot wedge 112 is also provided in the first embodiment.

Figure 10B:
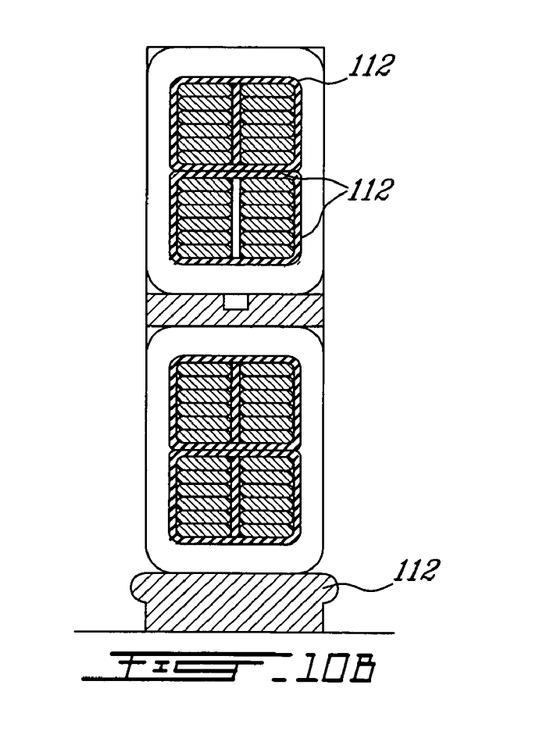
FIG. 10b is a cross section view showing a second embodiment wherein a rotor slot is filled by two multi-turns half-coils.

FIG. 10b shows a second embodiment wherein a rotor slot is filled by two multi-turn half-coils.

Figure 10C:
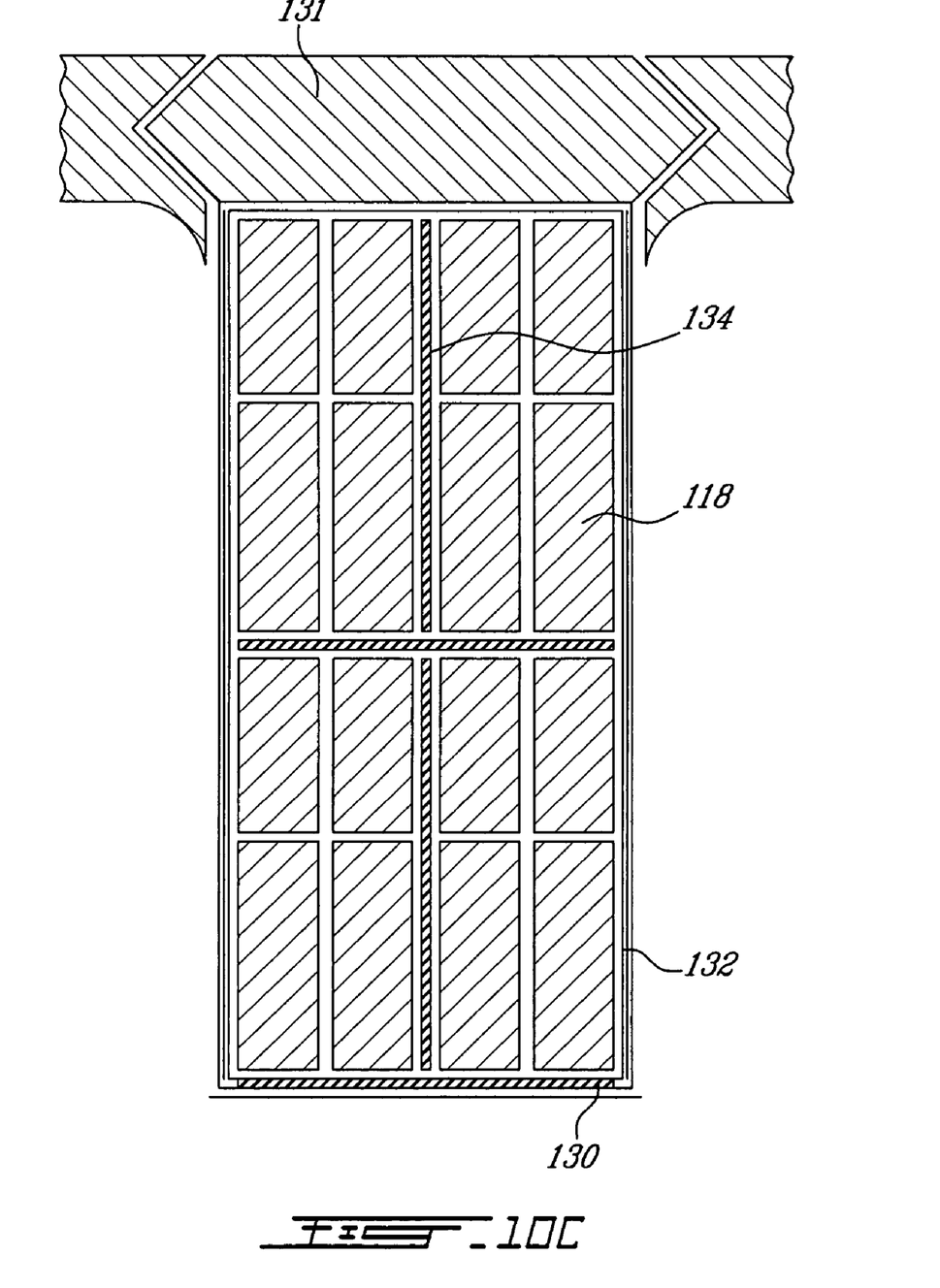
FIG. 10c is a cross section view showing a slot filled by four conductors belonging to two different windings connected in parallel.

FIG. 10c shows another embodiment wherein a rotor slot is filled by four conductors belonging to two different windings connected in parallel.

The embodiments of the invention described above are intended to be exemplary only. The scope of the invention is therefore intended to be limited solely by the scope of the appended claims.

We claim:

1. A method for converting a commutator exciter into a brushless exciter, said method comprising:
    providing a DC machine having a rotor and a stator, said rotor comprising a plurality of brushes, a plurality of coils and a plurality of commutators, said stator comprising stator poles;
    removing said plurality of brushes, said plurality of coils and said plurality of commutators from said DC machine;
    providing a suitable diode assembly on said rotor, said diode assembly having electrical characteristics for replacing the plurality of brushes, the plurality of coils and said plurality of commutators; and
    increasing or decreasing a number of said stator poles such that said brush less exciter has field currents and time constants that match those of said commutator exciter.

2. The method as claimed in claim 1, wherein said DC machine is energized using an existing voltage regulator, said method further comprising replacing said stator according to requirements created by said existing voltage regulator and said diode assembly provided on said rotor.

3. The method as claimed in claim 1, wherein said DC machine is energized using an existing voltage regulator, said method further comprising replacing said voltage regulator according to requirements created by said stator and said diode assembly provided on said rotor.

4. The method as claimed in claim 1, wherein the increasing or decreasing of the number of stator poles comprises removing the plurality of stator poles and replacing the plurality of stator poles with another plurality of stator poles.

5. The method as claimed in claim 1, wherein the commutator exciter provides a DC current signal to a rotor of a generator assembly, the DC current signal corresponding to a voltage having a maximum value, and wherein the diode assembly comprises diodes whose peak inverse voltage is greater than the maximum value of the voltage.

6. The method as claimed in claim 1, wherein the providing a suitable diode assembly comprises providing seven sets of coils namely a first, a second, a third, a fourth, a fifth, a sixth, and a seventh set of coils, wherein the first set of coils is connected to the second set of coils which is connected to the third set of coils which is connected to the fourth set of coils which is connect to the fifth set of coils which is connected to the sixth set of coils which is connected to the seventh set of coils which is connected to the first set of coils.

7. The method as claimed in claim 6, further comprising electrically connecting each connection between two successively connected sets of coils to both a positive line via a first diode and further a negative line via another diode.

8. The method as claimed in claim 1, wherein the providing a suitable diode assembly comprises providing a 3-phase diode assembly in a star configuration.

9. The method as claimed in claim 1, wherein the providing a suitable diode assembly comprises providing a first 3-phase diode assembly in a first star configuration and second 3-phase diode assembly in a second star configuration, the first and second star configurations being shifted by 30 electrical degrees.

10. The method as claimed in claim 1, further comprising inserting a crown of magnetic iron between new field poles resulting from the increasing or decreasing the number of said stator poles and an existing stator frame in order to reduce pole height.

11. The method as claimed in claim 1, wherein increasing or decreasing a number of said stator poles comprises adjusting a brushless field pole resistance to be substantially equal to a DC machine field pole resistance.

* * * * *